United States Patent
Shimada et al.

(10) Patent No.: US 9,438,020 B2
(45) Date of Patent: Sep. 6, 2016

(54) WIRING MODULE AND METHOD FOR ASSEMBLING WIRING MODULE

(71) Applicant: SUMITOMO WIRING SYSTEMS, LTD., Mie (JP)

(72) Inventors: Tomohiro Shimada, Mie (JP); Tetsuya Sonoda, Mie (JP); Isamu Hamamoto, Mie (JP); Yusuke Kobayashi, Mie (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 0 days.

(21) Appl. No.: 14/769,136

(22) PCT Filed: Feb. 18, 2014

(86) PCT No.: PCT/JP2014/053758
§ 371 (c)(1),
(2) Date: Aug. 20, 2015

(87) PCT Pub. No.: WO2014/136565
PCT Pub. Date: Sep. 12, 2014

(65) Prior Publication Data
US 2015/0380916 A1    Dec. 31, 2015

(30) Foreign Application Priority Data
Mar. 8, 2013   (JP) .................. 2013-046154

(51) Int. Cl.
*H02G 3/30* (2006.01)
*B60R 16/02* (2006.01)
*H02G 1/06* (2006.01)
*H02G 3/04* (2006.01)
*H02G 3/38* (2006.01)

(52) U.S. Cl.
CPC .............. *H02G 3/24* (2013.01); *B60R 16/0207* (2013.01); *H02G 1/06* (2013.01); *H02G 3/0437* (2013.01); *H02G 3/381* (2013.01)

(58) Field of Classification Search
CPC ...... H02G 3/24; H02G 3/0437; H02G 3/381; H02G 1/06
USPC ....................................... 171/72 A
See application file for complete search history.

(56) References Cited

FOREIGN PATENT DOCUMENTS

| JP | 8-332844 | 12/1996 |
|---|---|---|
| JP | 2004-074954 | 3/2004 |
| JP | 2004-314670 | 11/2004 |
| JP | 2012-123974 | 6/2012 |
| JP | 2012123974 A * | 6/2012 |

OTHER PUBLICATIONS

Search report from PCT/JP2014/053758, mail date is Apr. 28, 2014.

* cited by examiner

*Primary Examiner* — Timothy Thompson
*Assistant Examiner* — Paul McGee, III
(74) *Attorney, Agent, or Firm* — Greenblum & Bernstein, P.L.C.

(57) ABSTRACT

It is aimed to improve soundproofing of a wiring module. The wiring module is provided with a sheet-shaped first soundproofing member; a wire harness which contains at least one wire and is disposed at least partially along one main surface of the first soundproofing member, and a second soundproofing member. The second soundproofing member is provided partially to one main surface of the first soundproofing member and holds the wire harness interposed between the first soundproofing member and the second soundproofing member.

7 Claims, 4 Drawing Sheets

WIRING MODULE AND METHOD FOR ASSEMBLING WIRING MODULE

TECHNICAL FIELD

The present invention relates to wiring modules to be assembled into roofs or the like of vehicles.

BACKGROUND ART

Patent Document 1 discloses a harness unit in which a harness is held between a pair of sheets along a predetermined path and the pair of sheets is adhered to a rear surface of a headlining.

PRIOR ART DOCUMENTS

Patent Documents

Patent Document 1: JP 2004-74954A

SUMMARY OF THE INVENTION

Problem to be Solved by the Invention

With use of unwoven cloth or the like as the sheet in the above harness unit, the harness unit can be provided with soundproofing property.

However, in the technique disclosed in Patent Document 1, the harness unit, which has a layered structure in which the pair of sheets is layered, is formed to have a substantially even thickness in a surface direction thereof.

Therefore, if the maximum thickness of the harness unit is limited due to the limited space for disposing the harness unit or due to the work required for assembling the harness unit, it is necessary to set the total thickness of the harness unit to this limited maximum thickness or less.

Thus, even in case that unwoven cloth or the like is used as the sheet, it may be difficult to provide the harness unit with a desired soundproofing in some cases.

In addition, the harness unit is extended considerably in the technique disclosed in Patent Document 1, making it difficult to assemble it to a headlining.

The first object of the present invention is to improve the soundproofing property of the wiring module. The second object of the present invention is to easily assemble the wiring module to an assembly object to which it is assembled.

Means for Solving the Problem

In order to solve the first problem, a wiring module according to a first aspect comprises a sheet-shaped first soundproofing member; a wire harness including at least one wire, at least one portion of the wire harness being disposed along one main surface of the first soundproofing member; and a second soundproofing member which is provided partially to one main surface of the first soundproofing member and holds the wire harness interposed between the first soundproofing member and the second soundproofing member.

A second aspect is a wiring module according to the first aspect, wherein the second soundproofing member is provided to a portion of the first soundproofing member where a reinforcement member provided to an assembly object to which the wiring module is assembled is not disposed.

A third aspect is a wiring module according to the first or second aspect, wherein a plurality of the second soundproofing members are provided to the first soundproofing member, and wherein at least one of the clearances between the plurality of second soundproofing member is a straight clearance.

A fourth aspect is a wiring module according to the third aspect, wherein those portions of the plurality of second soundproofing members that have a straight clearance interposed therebetween extend to both ends of the first soundproofing member in a direction in which the straight clearance extends.

A fifth aspect is the wiring module according to any one of the first to fourth aspects, wherein the first soundproofing member is provided with a positioning opening, or both of the first soundproofing member and the second soundproofing member are provided with positioning openings.

In order to solve the second problem, a wiring module according to sixth aspect comprises a sheet-shaped soundproofing member; and a wire harness including at least one wire, at least one portion of the wire harness held along one main surface of the soundproofing member, wherein the soundproofing member is provided with a plurality of openings, and wherein the wiring module is folded to superimpose the plurality of openings on each other.

A seventh aspect is a wiring module according to sixth aspect, wherein at least one of the plurality of openings is formed at a portion where an electric device to be connected with the wire harness is disposed at an assembly object to which the wiring module is assembled.

A eighth aspect is a wiring module assembly method of assembling the wiring module according to sixth or seventh aspect to the assembly object comprises a step of disposing the folded wiring module to the assembly object while visually recognizing the assembly object through the superimposed openings; and a step of unfolding the folded wiring module on the assembly object.

Effect of the Invention

The wiring module according to the first aspect can achieve soundproofing to some extent in the entire wiring module, with the first soundproofing member. At a portion of the first soundproofing member in which the second soundproofing member is provided, it is possible to achieve soundproofing by the first soundproofing member as well as the second soundproofing member. With this arrangement, it is possible to improve soundproofing.

According to the second aspect, it is possible to achieve soundproofing with the first soundproofing member, at a portion of the assembly object in which a reinforcing member is disposed. In addition, at a portion of the assembly object in which the reinforcing member is not disposed, it is possible to achieve soundproofing with the first soundproofing member and the second soundproofing member. With this arrangement, it is possible to improve soundproofing.

According to the third aspect, at least one clearance of the plurality of second soundproofing members is straight, making it possible to easily fold the wiring module along the straight clearance.

According to the fourth aspect, portions of the plurality of second soundproofing members with the straight clearance interposed therebetween extend to both end portions of the first soundproofing member in the extension direction of the straight clearance, making it possible to achieve more superior soundproofing.

According to the fifth aspect, it is possible to position the wiring module in relation to the roof while recognizing a portion in the roof side through a positioning opening. With this arrangement, it is possible to easily attach the wiring module to the roof at an appropriate position.

According to the sixth aspect, it is possible to easily assemble the wiring module to the assembly object while visually recognizing a predetermined portion of the assembly object through the superimposed openings.

According to the seventh aspect, it is possible to easily assemble the wiring module to the assembly object while visually recognizing a position of an electric device through the superimposed openings.

According to the eighth aspect, it is possible to easily assemble the wiring module to the assembly object while visually recognizing the predetermined portion of the assembly object through the superimposed openings.

EMBODIMENTS OF THE INVENTION

Figure 1:
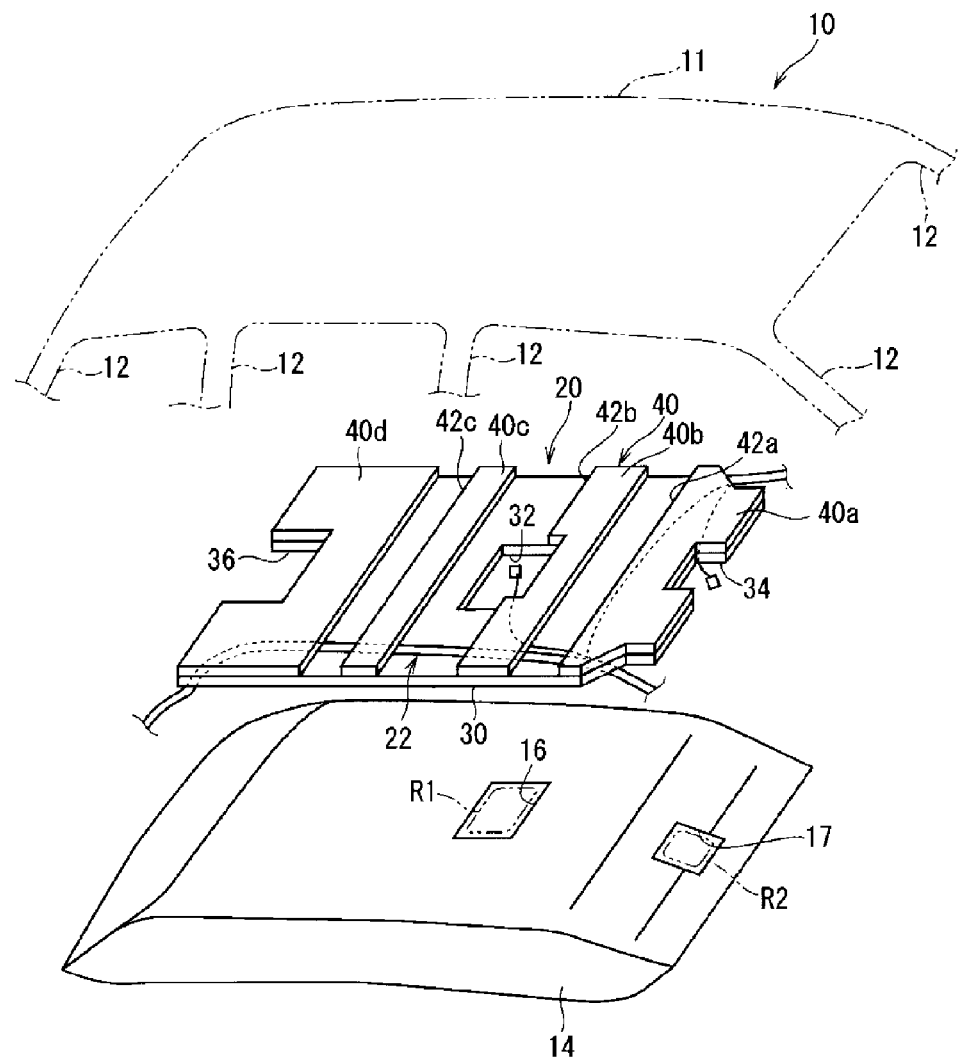
FIG. 1 is a schematic exploded perspective view showing a wiring module and an object to which it is assembled (assembly object) according to an embodiment.
Figure 2:
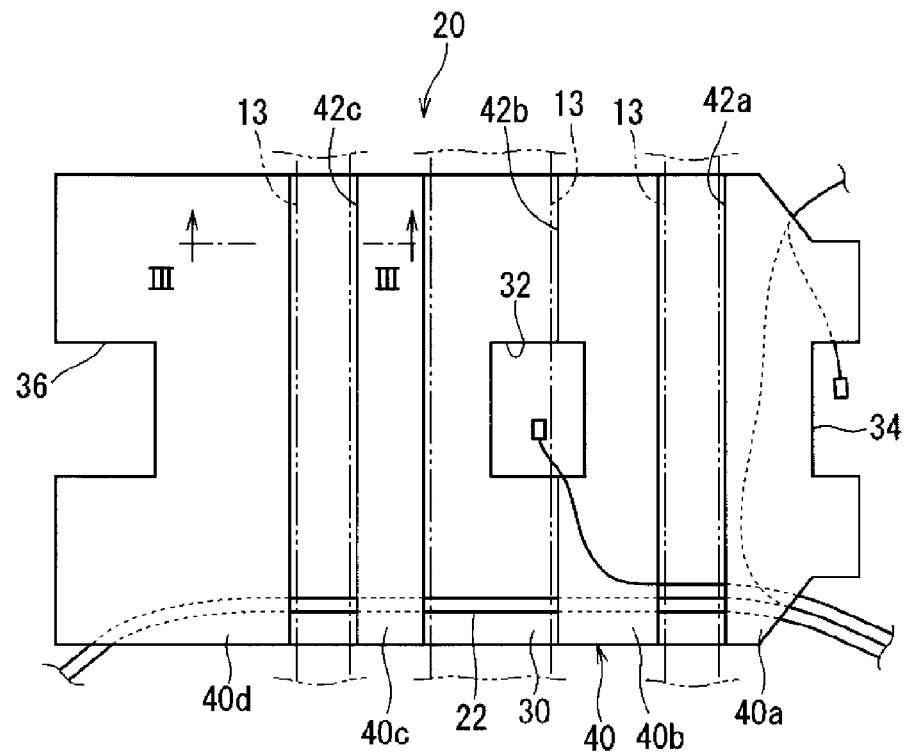
FIG. 2 is a schematic front view showing the wiring module 20.
Figure 3:
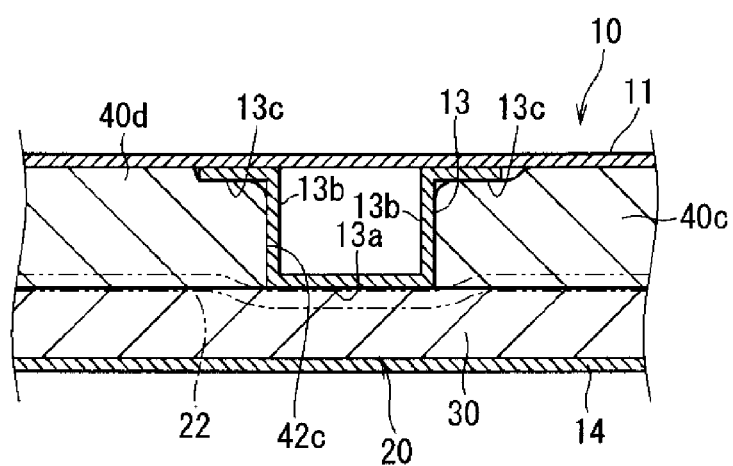
FIG. 3 is a schematic cross-sectional view along III-III in FIG. 2.

Hereinafter, a wiring module according to an embodiment will be explained. FIG. 1 is a schematic exploded perspective view showing a wiring module 20 and an object to which it is assembled (assembly object) according to an embodiment. FIG. 2 is a schematic front view showing the wiring module 20. FIG. 3 is a schematic cross-sectional view along III-III in FIG. 2.

Herein, an example will be explained in which a roof 10 in a vehicle serves as an assembly object to which the wiring module 20 is assembled. That is to say, the roof 10 in the vehicle is provided with a roof body 11 and a roof interior member 14.

The roof body 11 refers to that portion of a vehicle body forming a basic shape of the vehicle that covers a top of a vehicle interior, and is formed of a plate made of a metal or the like. The roof body 11 is provided at corner portions thereof with pillars 12 supporting the roof body 11. In addition, the roof body 11 is provided at its interior surface (bottom surface) with reinforcements 13 (see FIG. 3). The reinforcements 13 will be explained below with reference to the wiring module 20.

The roof interior member 14 is a plate-shaped member made of a resin or the like, and is referred to also as "roof lining". The roof interior member 14 is attached to cover an interior surface of the roof body 11.

The roof interior member 14 is attached to the interior surface of the roof body 11 while a clearance is formed therebetween. The wiring module 20 is disposed in the clearance.

The roof interior member 14 is provided with at least one portion to which an electric device is attached. Herein, a first attachment portion 16, where a room lamp R1 is attached for illuminating the entire vehicle interior, is provided further to the front than the center of the roof interior member 14. A second attachment portion 17, where a room lamp R2 is attached for illuminating a front seat, is provided at the front in the center of the roof interior member 14. The first attachment portion 16 and the second attachment portion 17 include opening portions and bump-shaped portions, where the room lamps R1, R2 are attached. The first attachment portion 16 and the second attachment portion 17 are not essential.

The wiring module 20 is provided with a wire harness 22, a first soundproofing member 30 and a second soundproofing member 40.

The wire harness 22 is wiring material in the vehicle, and includes at least one wire. Herein, the wire harness 22 is constituted by branching a plurality of wires according to a wiring form in the vehicle and bundling them together.

At least one portion of the wire harness 22 is disposed along one main surface of the first soundproofing member 30, and attached to the plate portion of the vehicle together with the first soundproofing member 30. Herein, the wire harness 22 is attached to the roof interior member 14 together with the first soundproofing member 30, and disposed at the clearance between the roof body 11 and the roof interior member 14.

As the plate-shaped portion of the assembly object to which the wiring module 20 is assembled, an upper plate-shaped portion of a dash board extending below the front window, a vehicle floor and the like can be utilized, as well as the roof interior member 14.

The branch portion of the wire harness 22 may be a portion where the wire harness 22 is disposed along the first soundproofing member 30, or a portion disposed outside of the first soundproofing member 30. The wire harness may also be constituted by a plurality of wires not having branches or by only a single wire. A portion of the wire harness 22 that is disposed along the first soundproofing member 30 extends along a plane. Connectors are attached to ends of the wires. While the wire harness 22 extends along a predetermined wiring form of the vehicle, the connectors are connected to electric parts in the vehicle, electrically connecting the electric parts to each other by way of the wire harness 22. The wire harness 22 may include an optical cable or the like.

A portion of the wire harness 22 extends through one side of the first soundproofing member 30 and a front side of the vehicle. A plurality of (here: three) end portions of the wire harness 22 are guided outward from corner portions (here, two corner portions on the front side and one corner portion on the rear side) of the first soundproofing member 30. Moreover, the other end portions of the wire harness 22 are guided outward from a first positioning opening 32 and a second positioning opening 34 in an intermediate portion in the width direction of the first soundproofing member 30. Possible wires to be assembled into the roof 10 a wire for the room lamp, a wire for the rear lamp, a wire for an antenna and the like.

The first soundproofing member 30 is sheet-shaped. The first soundproofing member 30 is preferably formed to extend over a region of the roof interior member 14 that is as large as possible. The shape of first soundproofing member 30 with respect to the roof interior member 14 can be appropriately set in consideration of interference with surrounding members. Herein, the first soundproofing member 30 is shaped into a rectangle elongated in a longitudinal direction of the vehicle. The first soundproofing member 30 is formed to have a smaller width at its front side portion than at its rear side portion.

While the first soundproofing member 30 extends along the roof interior member 14, the first soundproofing member 30 is provided at a portion thereof corresponding to the first attachment portion 16 with the first positioning opening 32. The first soundproofing member 30 is provided at a portion thereof corresponding to the second attachment portion 17 with the second positioning opening 34. Herein, the rectangular first positioning opening 32 is provided at a portion of the vehicle forward from the centre of the first soundproofing member 30. The second positioning opening 34 is formed at the center of the first soundproofing portion 30 in a width direction at the front side of the vehicle, and is rectangularly recessed inwardly from a front edge portion. When the first soundproofing member 30 is disposed along that surface of the roof interior member 14 that is on the side of the roof body 11, it is possible to dispose the first positioning opening 32 at the portion corresponding to the first attachment portion 16, as well as the second positioning opening 34 at the portion corresponding to the second attachment portion 17. The positioning opening may be an opening (see the first positioning opening 32) surrounded by something, or an opening (see the second positioning opening 34) extending outward at a portion of an outer circumference.

The first soundproofing member 30 is provided at its center in width direction on the rear side of the vehicle with a rectangular confirmation opening 36 extending inwardly from a lateral edge portion. It is not necessary to form the first positioning opening 32, the second positioning opening 34 and the confirmation opening 36 in the same width, but it is preferred that they overlap at least partially in the width direction of the first soundproofing member 30.

The first soundproofing member 30 is formed of a sheet-shaped material with superior soundproofing, for example non-woven material (non-woven sheet) extending planarly, for example. The non-woven material is formed by entwining a multiple of fibers with each other without weaving, and exhibits superior soundproofing characteristics, such as superior sound absorption and sound shielding. The fiber forming the non-woven material can be a natural fiber, a synthetic resin fiber, a glass fiber or the like. The first soundproofing member 30 can be made of a material exhibiting superior soundproofing performance such as foamed material. The first soundproofing member 30 is preferably made of a material capable of being bent without breaking, and preferably made of non-woven material in terms of this respect.

The second soundproofing member 40 is provided partially to one of the main surfaces of the first soundproofing member 30, and configured to be capable of holding the wire harness 22 interposed between the second soundproofing member 40 and the first soundproofing member 30.

The second soundproofing member 40 is also formed of a sheet-shaped material with a superior soundproofing performance, for example non-woven material (non-woven sheet) extending planarly. The non-woven material is formed by entwining a multiple of fibers with each other without weaving, and exhibits superior soundproofing characteristics, such as superior sound absorption and sound shielding. The fiber forming the non-woven material can be a natural fiber, a synthetic resin fiber, a glass fiber or the like. The second soundproofing member 40 can be made of a material exhibiting superior soundproofing such as foamed material.

The second soundproofing member 40 is partially provided to the first soundproofing member 30 in the following aspect.

That is to say, this wiring module 20 includes a plurality of (four, herein) second soundproofing members 40a, 40b, 40c, 40d. Hereinafter, the entirety of second soundproofing members is categorically referred to as the second soundproofing member 40, and each of the second soundproofing members will be referred to also as a second soundproofing member 40a (or 40b, 40c, 40d).

The second soundproofing members 40a, 40b, 40c, 40d are provided to the first soundproofing member 30 in this order from the front side of the vehicle to the rear side thereof, and spaced apart from each other.

The second soundproofing member 40a is provided to a portion of the first soundproofing member 30 on the front side of the vehicle. The second soundproofing member 40a is fitted to the exterior shape of the first soundproofing member 30, on the front side and both lateral sides of the vehicle. Therefore, the second soundproofing member 40a extends to both lateral sides of the first soundproofing member 30 in the width direction of the first soundproofing member 30 (extension direction of the clearance 42a described below). The second soundproofing member 40a is provided at a portion thereof corresponding to the second positioning portion 34 of the first soundproofing member 30 with an opening (opening with the same shape as the second positioning portion 34) exposing therethrough the second positioning portion 34.

The second soundproofing member 40a can be adhered to the first soundproofing member 30 by means of heat welding, ultrasonic welding, or with use of an adhesive agent, a gluing agent, a double-stick tape or the like. In case of using heat welding, at least one of the first soundproofing member 30 and the second soundproofing member 40a is preferably made of an unwoven member containing an elementary fiber and a binder resin having a lower melting point than the elementary fiber.

While the wire harness 22 is interposed between the first soundproofing member 30 and the second soundproofing member 40a, the second soundproofing member 40a is adhered to the first soundproofing member 30, making it possible to hold the wire harness 22 interposed therebetween. The portion for the adhesion may be only an edge of the second soundproofing member 40a or a portion inward from the edge. The second soundproofing members 40b, 40c, 40d described below are also adhered to the first soundproofing member 30 in the same way.

The second soundproofing member 40b is provided to the first soundproofing member 30 in a more rearward side of the vehicle than the second soundproofing member 40a and spaced apart therefrom. A straight clearance 42a is provided along the width direction of the vehicle between the second soundproofing member 40a and the second soundproofing member 40b.

Both lateral sides of the second soundproofing member 40b match the exterior shape of the first soundproofing member 30. Therefore, the second soundproofing member 40b extends up to both lateral sides of the first soundproofing member 30 in the width direction (extension direction of the clearance 42a described below) of the first soundproofing member 30.

A portion of the second soundproofing member 40*b* overlaps with the first positioning opening 32 of the first soundproofing member 30. The portion of the second soundproofing member 40*b* that corresponds to the first positioning opening 32 is provided with an opening (here, an opening which is recessed towards the front side of the vehicle from the edge of the second soundproofing member 40*b* on the rear side of the vehicle) which exposes therethrough the first positioning opening 32.

The clearance 42*a* is arranged to be positioned between the first positioning opening 32 and the second positioning opening 34. The clearance 42*a* is preferably arranged such that its center line in the longitudinal direction of the vehicle passes through the midpoint between the center of the first positioning opening 32 in the longitudinal direction of the vehicle and the center of the second positioning opening 34 in the longitudinal direction of the vehicle. With this arrangement, when the wiring module 20 is folded at the center line of the clearance 42*a*, the first positioning opening 32 and the second positioning opening 34 are disposed to be superimposed on each other.

The second soundproofing member 40*c* is provided to be spaced apart from the rear side of the soundproofing member 40*b*, on the first soundproofing member 30. A clearance 42*b* is linearly provided along the width direction of the vehicle between the second soundproofing member 40*b* and the second soundproofing member 40*c*.

Portions on both lateral sides of the second soundproofing member 40*c* match the exterior shape of the first soundproofing member 30. Therefore, the second soundproofing member 40*c* extends to both lateral portions of the first soundproofing member 30 in the width direction of the first soundproofing member 30.

The soundproofing member 40*d* is spaced apart from the rear side of the second soundproofing member 40*c*, on the first soundproofing member 30. A clearance 42*c* is linearly provided along the width direction of the vehicle between the second soundproofing member 40*c* and the second soundproofing member 40*d*.

The soundproofing member 40*d* is formed, at portions thereof on both lateral sides and the rear side of the vehicle, to match the exterior shape of the first soundproofing member 30. Therefore, the second soundproofing member 40*d* extends to both lateral sides of the first soundproofing member 30, in the width direction of the first soundproofing member 30. The second soundproofing member 40*d* is provided at its center on the rear side of the vehicle in the width direction, with an opening (herein, an opening which is recessed towards the front side of the vehicle from the edge of the second soundproofing member 40*d* on the rear side of the vehicle) which exposes therethrough the confirmation opening 36.

The clearance 42*c* is positioned between the first positioning opening 32 and the confirmation opening 36. The clearance 42*c* is preferably arranged such that its center line is positioned at the midpoint between the center of the first positioning opening 32 in the longitudinal direction of the vehicle and the center of the confirmation opening 36 in the longitudinal direction of the vehicle. With this arrangement, when the wiring module 20 is folded along the center line of the clearance 42*c*, the first positioning opening 32 and the confirmation opening 36 are disposed to be superimposed on each other.

The relationship in the formation positions between the second soundproofing members 40*a*, 40*b*, 40*c*, 40*d* and the clearances 42*a*, 42*b*, 42*c* with respect to the first soundproofing member 30 is preferably set in consideration of at least one of the following two viewpoints.

The first viewpoint refers to consideration of relationship with the reinforcements 13, which are reinforcement members provided to the roof, which serves as the assembly object.

That is to say, the second soundproofing member 40 is provided to those portions of the first soundproofing member 30 where the reinforcements 13 are not disposed.

Herein, the reinforcements 13 are reinforcement members which are disposed on an interior surface (bottom surface) of the roof body 11. The reinforcements 13 are formed of elongated members made of metallic plates or the like. More specifically, the reinforcements 13 are provided at both sides of an elongated plate-shaped reinforcement main body portion 13*a* with a pair of lateral portions 13*b*, and fixture portions 13*c* which extend outward from front edge portions of the pair of lateral portions 13*b*. The reinforcements 13 have the same length as the dimension of the roof body 11 in the width direction. A plurality of the reinforcements 13 are disposed at plural portions in the longitudinal direction of the roof body 11 along the width direction of the roof body 11. Each reinforcement 13 is fixed to the interior surface of the roof body 11 by welding the pair of fixture portions 13*c* to the interior surface of the roof body 11.

While the roof interior member 14 is attached to the roof body 11, there are relatively large gaps between the roof body 11 and the roof interior member 14 at portions where the reinforcements 13 are not provided. The protrusion size of the reinforcements 13 protruding from the roof body 11 is smaller than the gap between the roof body 11 and the roof interior member 14. Therefore, there is a smaller gap between the reinforcement 13 and the roof interior member 14 than the gap between the roof body 11 and the roof interior member 14.

The second soundproofing members 40*a*, 40*b*, 40*c*, 40*d* are provided at portions of the first soundproofing member 30 where the reinforcements 13 are not disposed, between the reinforcements 13. That is to say, the reinforcements 13 are provided at the clearances 42*a*, 42*b*, 42*c* between the second soundproofing members 40*a*, 40*b*, 40*c*, 40*d*.

In this configuration, it is possible to achieve superior soundproofing with a multi-layered structure of the first soundproofing member 30 and the second soundproofing member 40 in the regions between the roof body 11 and the roof interior member 14 where the reinforcements 13 are not provided. In addition, it is possible to achieve superior soundproofing with the first soundproofing member 30 in the regions between the roof body 11 and the roof interior member 14 where the reinforcements 13 are provided. As a result, it is possible to achieve superior soundproofing in the entire region between the roof body 11 and the roof interior member 14.

The first soundproofing member 30 and the second soundproofing member 40 are preferably provided while avoiding clearances between the roof body 11 and the roof interior member 14 as much as possible. Therefore, the sum of thicknesses of the first soundproofing member 30 and the second soundproofing member 40 is preferably set to be substantially equal to the size of clearance at the portions between the roof body 11 and the roof interior member 14 where the reinforcements 13 are not provided, or larger to the extent that the first soundproofing member 30 and the second soundproofing member 40 can be compacted. The thickness of the first soundproofing member 30 is set to be substantially equal to the size of the clearance between the reinforcements 13 and the roof interior member 14, or larger to the extent that the first soundproofing member 30 can be compacted.

The second viewpoint refers to consideration of folding the wiring module 20.

That is to say, the clearances 42a, 42b, 42c are formed to be straight between the second soundproofing members 40a, 40b, 40c, 40d. Therefore, in the entire wiring module 20, there are the clearances 42a, 42b, 42c provided in the straight regions (the regions where the second soundproofing members 40 are not present) which have relatively small thicknesses and are easily folded between the regions (the regions where the second soundproofing members 40a, 40b, 40c, 40d are provided) which have relatively large thicknesses and are hard to be folded. Therefore, it is possible to fold the wiring module 20 into a compact form by folding the wiring module 20 at the clearances 42a, 42b, 42c.

In this configuration, the clearance 42a is positioned between the first positioning opening 32 and the second positioning opening 34. The clearance 42c is positioned between the first positioning opening 32 and the confirmation opening 36. When the wiring module 20 is folded at the clearance 42a, the first positioning opening 32 and the second positioning opening 34 can be disposed to be superimposed on each other. When the wiring module 20 is folded at the clearance 42c, the first positioning opening 32 and the confirmation opening 36 can be disposed to be superimposed on each other. With this arrangement, it is possible to dispose and superimpose the first positioning opening 32, the second positioning opening 34 and the confirmation opening 36 on each other while the wiring module 20 is folded at the clearances 42a, 42c.

Thus, the wiring module 20 is folded so as to superimpose one opening (herein, the second positioning opening 34 or the confirmation opening 36) on another opening (herein, the first positioning opening 32), making it possible to assemble the wiring module 20 while confirming the disposition of the predetermined portions of the assembly object within the opening as described below.

The wiring module 20 will be explained in terms of assembly examples.

The wiring module 20 may be delivered folded as described below, for example.

Figure 4:
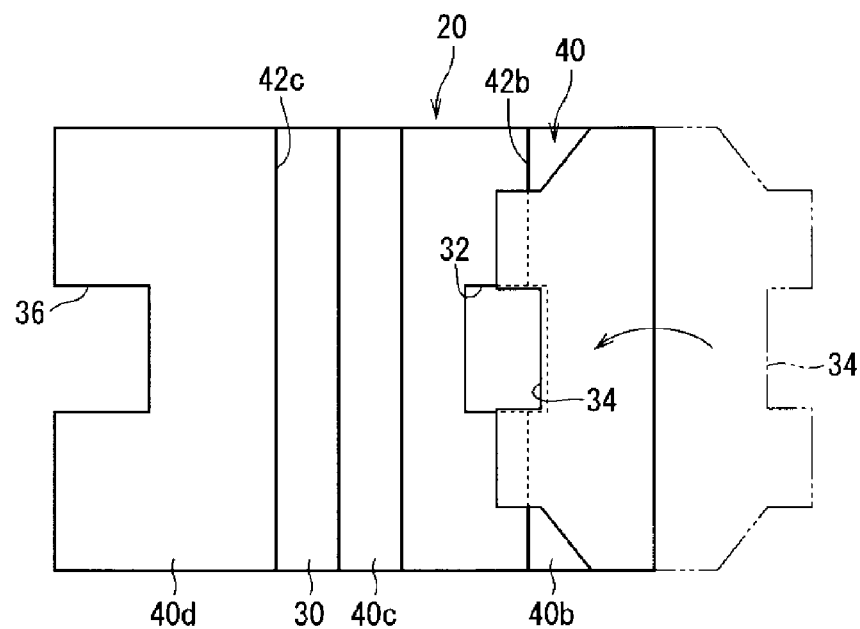
FIG. 4 is a diagrammatic view showing a working example of folding the wiring module.
Figure 5:
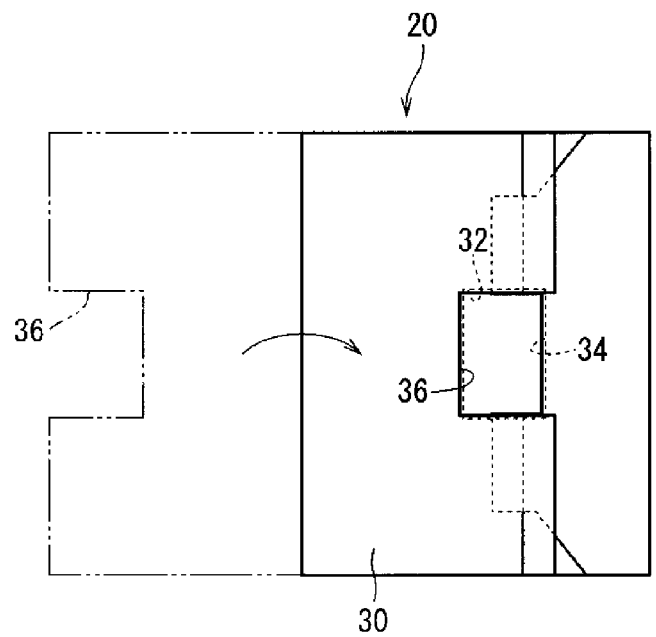
FIG. 5 is a diagrammatic view showing a working example of folding the wiring module.

That is to say, as shown in FIG. 4, the wiring module 20 is folded at the clearance 42a so as to superimpose the second positioning opening 34 on the first positioning opening 32. Next, as shown in FIG. 5, the wiring module 20 is folded at the clearance 42c so as to superimpose the confirmation opening 36 on the first positioning opening 32 and the second positioning opening 34. Thus, its folded form, the wiring module 20 is provided with the opening which runs from one surface to the opposite surface through the first positioning opening 32, the second positioning opening 34 and the confirmation opening 36.

The wiring module 20 is folded at least at one portion (herein, at a plurality of portions) as described above, enabling it to achieve a relatively small occupation area and to be delivered easily.

The wiring module 20 is attached to the roof interior member 14 in the following way.

Figure 6:
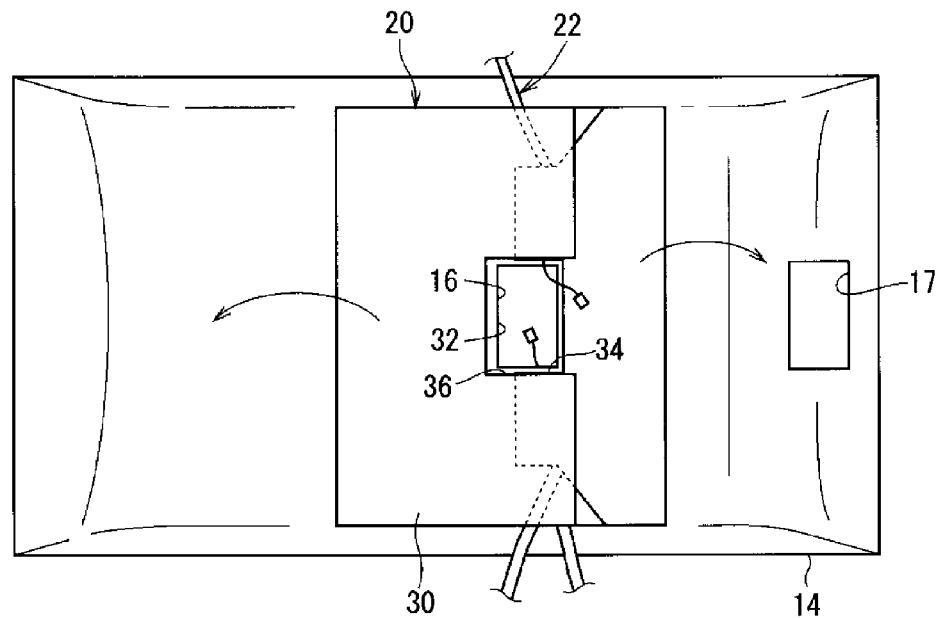
FIG. 6 is a diagrammatic view showing a working example of routing the wiring module in a roof interior member.

That is to say, as shown in FIG. 6, the wiring module 20 is disposed in its folded form on the roof interior member 14. In this situation, the first positioning opening 32 is disposed on the first attachment portion 16 of the roof interior member 14. In this situation, the second positioning opening 34 and the confirmation opening 36 are opened at the same position as the first positioning opening 32. With this arrangement, it is possible for workers to adjust the position of the folded wiring module 20 while confirming the relative positions of the first positioning opening 32 and the first attachment portion 16 through the second positioning opening 34 and the confirmation opening 36. From this viewpoint of the wiring module, the second soundproofing member does not have to be provided partially on the first soundproofing member, and may be provided on the entire first soundproofing member. In addition, the second soundproofing member is not essential, and the wire harness may be held by the first soundproofing member by means of an adhesive agent, a gluing agent, another fixture member or the like.

Subsequently, as necessary, in the vicinity of the first positioning opening 32 and the first attachment portion 16, steps are undertaken to attach the wiring module 20 to the roof interior member 14 and to connect connectors of the wire harness 22 to the first attachment portion 16. The attachment of the wiring module 20 to the roof interior member 14 can be undertaken by means of a hot melt adhesive material, a double-sided tape or the like. In addition, these steps can be undertaken subsequent to the unfolding of the wiring module 20.

Figure 7:
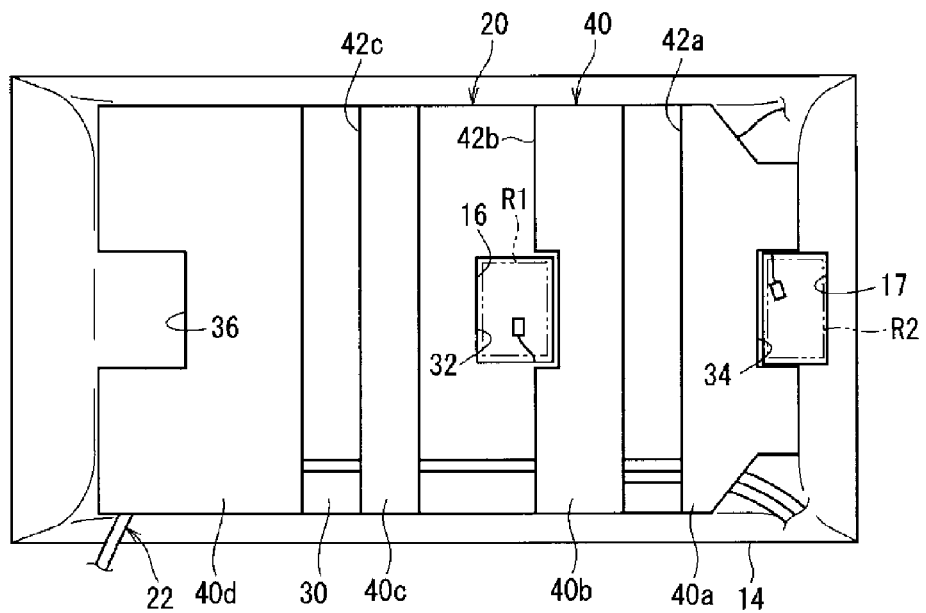
FIG. 7 is a diagrammatic view showing a working example of routing the wiring module in the roof interior member.

Next, as shown in FIG. 7, the wiring module is disposed to extend on the roof interior member 14 such that the second positioning opening 34 is positioned at the second attachment portion 17 of the roof interior member 14 while the folded portions of the wiring module 20 are opened.

Next, as necessary, steps are undertaken to attach the wiring module 20 to the roof interior member 14 and to connect the connectors of the wire harness 22 to the second attachment portion 17.

As described above, after the wiring module 20 is attached to the roof interior member 14, the roof interior member 14 is assembled to the roof body 11, thus assembling the wiring module 20 to the roof 10. End portions of the wire harness 22 extending from the wiring module 20 are appropriately laid along the pillars 12, as necessary.

According to the wiring module 20 configured in the above way, the wiring module 20 is assembled to the roof interior member 14, making it possible to assemble the wire harness 22 to the roof interior member 14. Therefore, it is possible to omit a path display of the wire harness, which is required for conventional assembly of the wire harness directly to the roof interior member. It is also possible to omit steps for attachment of the wire harness to the roof interior member at a multiple of locations by means of cramp parts, fixture tapes or the like. Thereby, it is possible to easily assemble wires to the roof 10.

This wiring module 20 achieves superior soundproofing with the first soundproofing member 30 and the second soundproofing member 40. Therefore, without need for attachment of separate parts for soundproofing, it is possible to easily attach the wire harness 22 and the soundproofing members 30, 40 to the roof 10.

In particular, with the first soundproofing member 30, it is possible to achieve soundproofing to some extent in the overall wiring module 20. It is possible to achieve soundproofing with a layered structure having a plurality of layers of the first soundproofing member 30 and the second soundproofing member 40 at those portions of the first soundproofing member 30 where the second soundproofing member 40 is provided.

Specifically, it is possible to achieve soundproofing with the first soundproofing member 30, at locations of the assembly object where the reinforcements 13 are disposed. It is possible to achieve soundproofing with the layered structure having a plurality of layers of the first soundproofing member 30 and the second soundproofing member 40 at those locations of the assembly object where the reinforcements 13 are not provided.

With this configuration, it is possible to improve soundproofing by minimizing space restrictions at the portions where the wiring module 20 is disposed.

In addition, the at least one clearance 42a, 42c between the plurality of the second soundproofing members 40a, 40b, 40c, 40d, is straight, making it possible to easily fold the wiring module 20 along the straight clearances 42a, 42c. With this arrangement, it is possible to conveniently deliver and store the wiring module 20.

The second soundproofing members 40a, 40b, 40c, 40d interposing the clearances 42a, 42c are provided to extend to the both ends of the first soundproofing member 30 in the direction in which the clearances 42a, 42c extend, making it possible to enlarge the regions where the second soundproofing members 40a, 40b, 40c, 40d are disposed for achieving superior soundproofing. The second soundproofing members 40a, 40b, 40c, 40d may also have widths smaller than the width of the first soundproofing member 30.

The first soundproofing member 30 is provided with the first positioning opening 32 and the second positioning opening 34. The second soundproofing members 40a, 40b superimposed on the first soundproofing member 30 are also provided with openings corresponding to the first positioning opening 32 and the second positioning opening 34. Therefore, when the wiring module 20 is disposed along the roof interior member 14, it is possible to adjust the positions of the first positioning opening 32 and the first attachment portion 16 through the first positioning opening 32, and to adjust the positions of the second positioning opening 34 and the second attachment portion 17 through the second positioning opening 34. Thus, it is possible to position the wiring module 20 with respect to the roof interior member 14 more precisely.

While the present invention has been described in detail, the above explanations are in all aspects illustrative. The present invention is not limited to the explanations. It is understood that numerous variation examples not shown in drawings can be devised without departing from the scope of the invention.

REFERENCE SIGNS LIST

10: roof
11: roof body
13: reinforcement
14: roof interior member
16: first attachment portion
17: second attachment portion
20: wiring module
22: wire harness
30: first soundproofing member
32: first positioning opening
34: second positioning opening
40 (40a, 40b, 40c, 40d, 40e): second soundproofing member
42a, 42b, 42c: clearance

The invention claimed is:

1. A wiring module comprising:
a sheet-shaped first soundproofing member,
a wire harness including at least one wire, at least one portion of the wire harness being disposed along one main surface of the first soundproofing member, and
a second soundproofing member which is provided partially to the one main surface of the first soundproofing member and holds the wire harness interposed between the first soundproofing member and the second soundproofing member,
wherein the second soundproofing member is provided to a portion of the first soundproofing member where a reinforcement member provided to an assembly object to which the wiring module is assembled is not disposed.

2. The wiring module according to claim 1,
wherein a plurality of the second soundproofing members are provided to the first soundproofing member, and
wherein at least one of clearances between the plurality of second soundproofing member is a straight clearance.

3. The wiring module according to claim 2,
wherein those portions of the plurality of second soundproofing members that have a straight clearance interposed therebetween extend to both ends of the first soundproofing member in a direction in which the straight clearance extends.

4. The wiring module according to claim 1,
wherein the first soundproofing member is provided with a positioning opening, or both of the first soundproofing member and the second soundproofing member are provided with positioning openings.

5. A wiring module comprising:
a sheet-shaped soundproofing member, and
a wire harness including at least one wire, at least one portion of the wire harness held along one main surface of the soundproofing member,
wherein the soundproofing member is provided with a plurality of openings, and
wherein the wiring module is folded to superimpose the plurality of openings on each other.

6. The wiring module according to claim 5,
wherein at least one of the plurality of openings is provided at a portion where an electric device to be connected with the wire harness is disposed on an assembly object to which the wiring module is assembled.

7. A wiring module assembly method of assembling the wiring module according to claim 5 to an assembly object, comprising:
disposing the folded wiring module on the assembly object while visually recognizing the assembly object through the superimposed openings, and
unfolding the folded wiring module on the assembly object.

* * * * *